US011360506B2

(12) United States Patent
Franke et al.

(10) Patent No.: US 11,360,506 B2
(45) Date of Patent: Jun. 14, 2022

(54) MOUNTING ASSEMBLIES FOR PERIPHERAL MODULES

(71) Applicant: HEWLETT-PACKARD DEVELOPMENT COMPANY, L.P., Houston, TX (US)

(72) Inventors: Gregory C. Franke, Houston, TX (US); Chih Chien Chen, Taipei (TW); Ming-Shan Tsai, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 985 days.

(21) Appl. No.: 16/075,598

(22) PCT Filed: Jul. 6, 2017

(86) PCT No.: PCT/US2017/040938
§ 371 (c)(1),
(2) Date: Aug. 4, 2018

(87) PCT Pub. No.: WO2019/009907
PCT Pub. Date: Jan. 10, 2019

(65) Prior Publication Data
US 2020/0209914 A1 Jul. 2, 2020

(51) Int. Cl.
*H05K 5/02* (2006.01)
*G06F 1/16* (2006.01)
*G06F 13/10* (2006.01)

(52) U.S. Cl.
CPC .......... *G06F 1/1605* (2013.01); *G06F 13/102* (2013.01); *G06F 2200/1631* (2013.01)

(58) Field of Classification Search
CPC .................. G06F 1/1605; G06F 13/102; G06F 2200/1631
See application file for complete search history.

(56) References Cited

U.S. PATENT DOCUMENTS

| 5,530,473 A | 6/1996 | Sakai |
| 5,959,671 A | 9/1999 | Etoh et al. |
| 6,093,044 A | 7/2000 | Arbuckle |

(Continued)

FOREIGN PATENT DOCUMENTS

| CN | 2870332 Y | * | 2/2007 |
| CN | 2870332 Y | | 2/2007 |

(Continued)

*Primary Examiner* — Adrian S Wilson
*Assistant Examiner* — Gage Crum
(74) *Attorney, Agent, or Firm* — Conley Rose PC

(57) ABSTRACT

In some examples, an electronic device includes an outer housing an outer housing including a recess to receive a peripheral module. In addition, the electronic device includes a mounting assembly to move the peripheral module into and out of the recess of the outer housing. The mounting assembly is moveably coupled to the outer housing. The mounting assembly includes a latch mechanism to removably attach the mounting assembly to the peripheral module. The mounting assembly includes a first electrical connector to removably connect to a second electrical connector of the peripheral module. The latch mechanism includes an arm and a lip to move into and out of engagement with a shoulder of the peripheral module. The lip is disposed along the arm.

15 Claims, 7 Drawing Sheets

(56) References Cited

U.S. PATENT DOCUMENTS

| | | | |
|---|---|---|---|
| 6,417,884 B1 | 7/2002 | Chang et al. | |
| 6,812,958 B1* | 11/2004 | Silvester | G06F 1/1607 348/207.1 |
| 7,061,536 B2 | 6/2006 | Cha | |
| 7,176,945 B2 | 2/2007 | Ohba | |
| 7,466,542 B2* | 12/2008 | Kuo | G06F 1/1607 348/207.1 |
| 7,969,721 B2 | 6/2011 | Hsu et al. | |
| 8,018,715 B2* | 9/2011 | Chang | G06F 1/1624 361/679.04 |
| 8,203,646 B2 | 6/2012 | Fan | |
| 2008/0013262 A1 | 1/2008 | Stanford et al. | |
| 2008/0166898 A1* | 7/2008 | Hubert | G06K 19/077 439/64 |
| 2008/0198262 A1 | 8/2008 | Kuo et al. | |
| 2014/0009628 A1* | 1/2014 | Jang | G06F 1/1624 361/679.04 |
| 2014/0375783 A1 | 12/2014 | Goldenberg et al. | |
| 2015/0029390 A1 | 1/2015 | Kim et al. | |

FOREIGN PATENT DOCUMENTS

| | | | |
|---|---|---|---|
| CN | 101627671 | | 1/2010 |
| CN | 102789265 | A | 12/2012 |
| CN | 102957763 | | 3/2013 |
| CN | 103517593 | | 1/2014 |
| CN | 103533406 | | 1/2014 |
| CN | 204217258 | | 3/2015 |
| CN | 104571271 | | 4/2015 |
| CN | 104902717 | | 9/2015 |
| CN | 105141815 | | 12/2015 |
| CN | 105308534 | | 2/2016 |
| EP | 0774140 | | 2/1996 |
| EP | 1785572 | | 5/2007 |
| EP | 3104250 | | 12/2016 |
| JP | 11313233 | A * | 11/1999 |
| JP | H11313233 | A | 11/1999 |
| JP | 2004088738 | A | 3/2004 |
| WO | WO2016018222 | | 2/2016 |

* cited by examiner

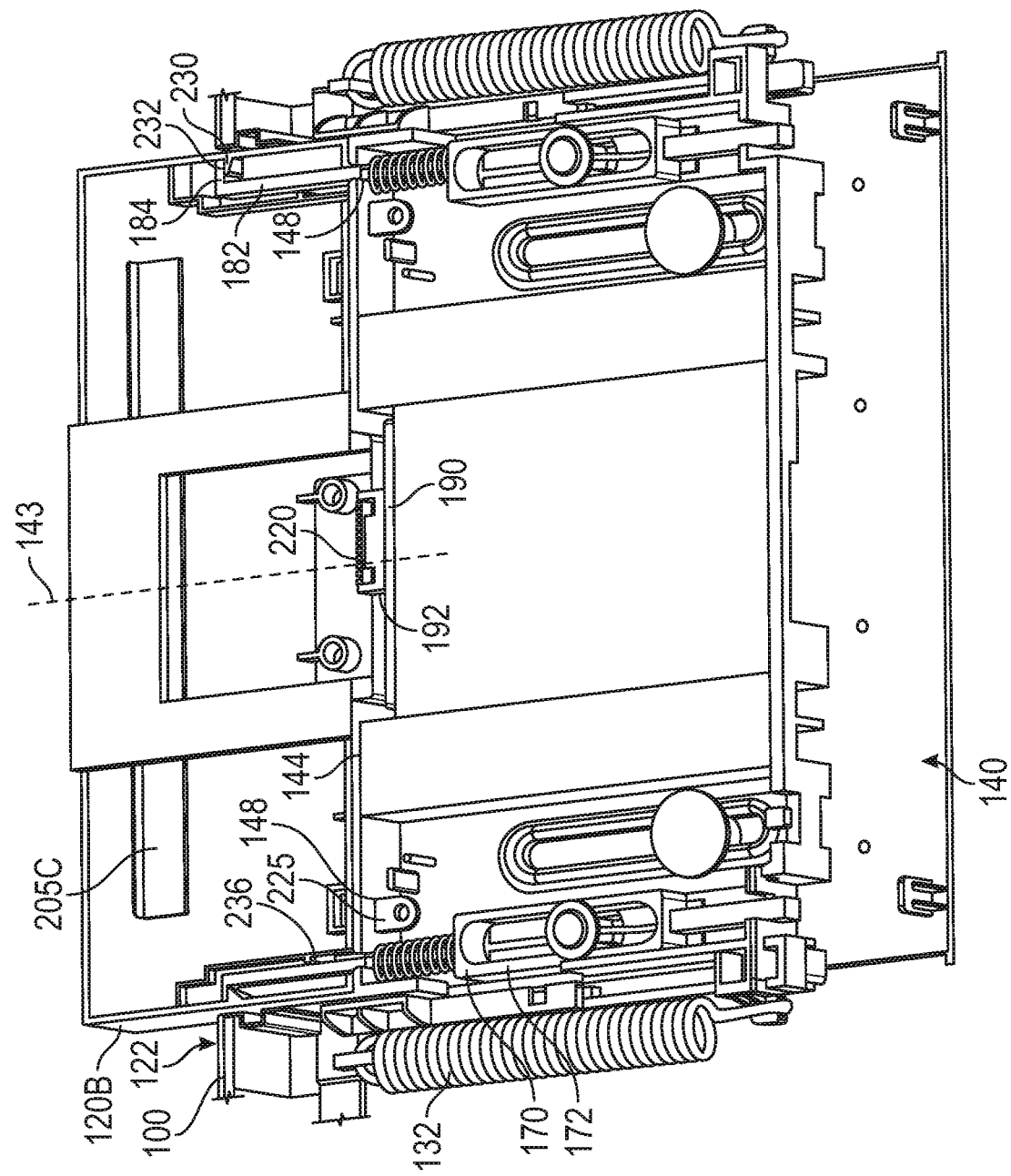

MOUNTING ASSEMBLIES FOR PERIPHERAL MODULES

BACKGROUND

Various electronic devices, such as stand-alone monitors, portable computers, desktop computers, and all-in-one (AiO) desktop computers, include cameras incorporated into the body of the device. For various reasons, the cameras may eventually need to be removed or replaced.

BRIEF DESCRIPTION OF THE DRAWINGS

Various examples are described below referring to the following figures:

FIG. 8 shows a perspective view of the camera module of FIG. 6 installed in the electronic display device of FIG. 1 with the camera module in an operational position in accordance with various examples.

DETAILED DESCRIPTION

Figure 1:
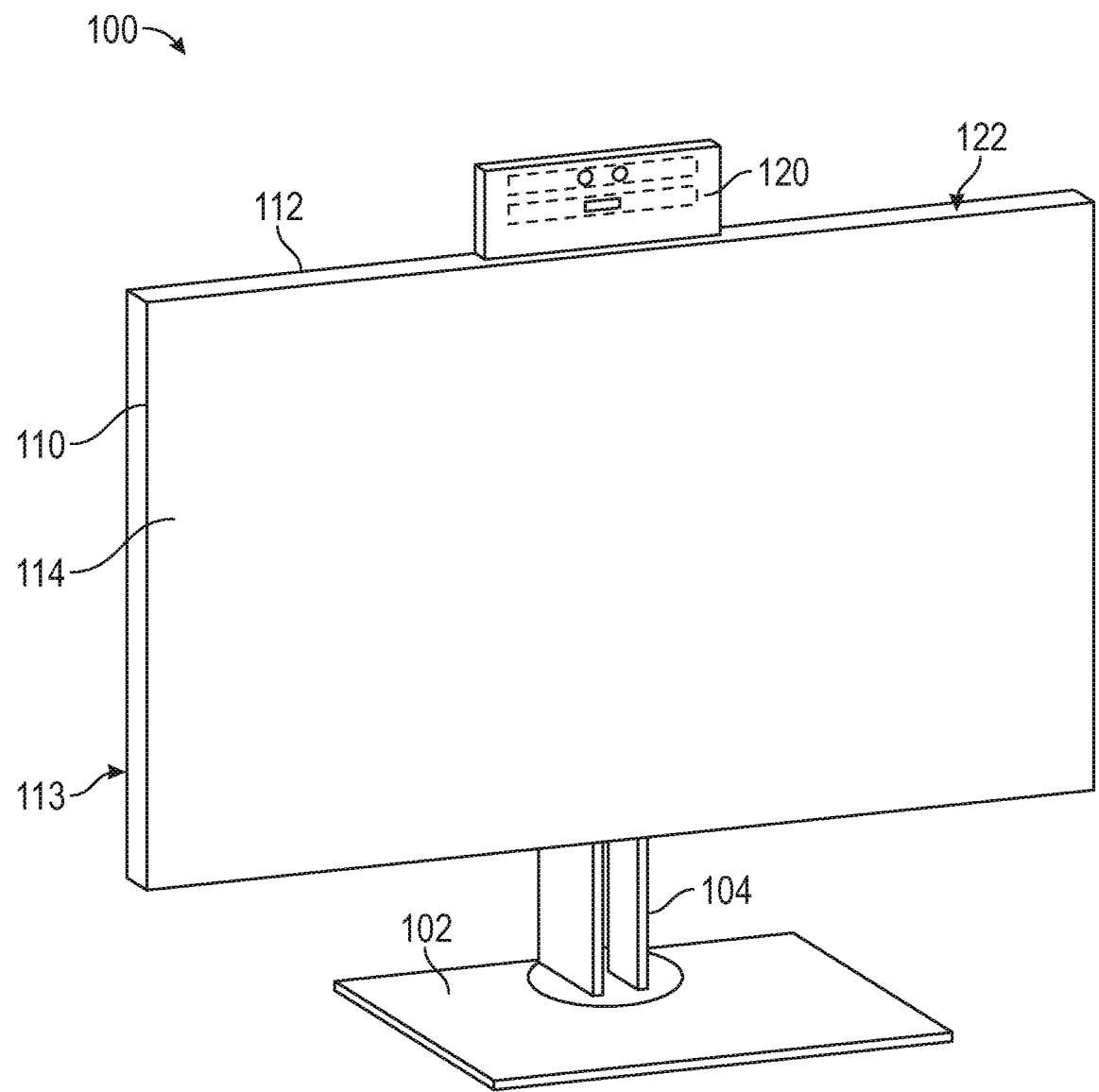
FIG. 1 shows an electronic device having a retractable, removable peripheral module installed in accordance with various examples.

In the following discussion and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. In addition, as used herein, the terms "axial" and "axially" generally refer to positions along or parallel to a central or longitudinal axis (e.g., central axis of a body or a port), while the terms "lateral" and "laterally" generally refer to positions located or spaced to the side of the central or longitudinal axis.

As used herein, including in the claims, the word "or" is used in an inclusive manner. For example, "A or B" means any of the following: "A" alone, "B" alone, or both "A" and "B." In addition, when used herein including the claims, the word "generally" or "substantially" means within a range of plus or minus 20% of the stated value.

Many types of electronic devices include an outer housing and a camera mounted within the outer housing. Accessing the camera often requires the disassembly of the outer housing or at least removing a cover of the outer housing to gain access to the camera. Consequently, installing a camera, removing a camera, or replacing a camera of such electronic devices may be a time consuming and complex process. Examples described herein are directed to apparatuses for removably attaching and detaching peripheral module, such as camera modules that may include a webcam, to and from electronic devices like All-in-One (AiO) computers. In accordance with various examples, the peripheral modules can be installed and removed from the associated electronic devices without removing a cover panel to gain access. To facilitate this objective, this disclosure is directed to examples of electronic devices that include an outer housing, a display screen supported within the outer housing, and a recess in the outer housing that receives movably a peripheral module. A mounting assembly moveably couples the peripheral module to the outer housing and allows the peripheral module to move linearly into and out of the recess. An example mounting assembly includes a latch mechanism that removably attaches to the peripheral module and an electrical interconnect for transferring electrical signals between the webcams and a circuit board or the display screen. The interconnect includes a first electrical connector coupled fixably (e.g., affixed) to the mounting assembly (e.g., moves with the mounting assembly), and the first electrical connector may be connected to a second electrical connector that is coupled fixably to the peripheral module.

In one example in accordance with the present disclosure, an electronic device comprises an outer housing including a recess to receive a peripheral module. The electronic device also comprises a mounting assembly to move the peripheral module into and out of the recess of the outer housing. The mounting assembly is moveably coupled to the outer housing. The mounting assembly includes a latch mechanism to removably attach the mounting assembly to the peripheral module. In addition, the mounting assembly includes a first electrical connector to removably connect to a second electrical connector of the peripheral module. The latch mechanism includes an arm and a lip disposed along the arm. The arm and a lip are to move into and out of engagement with a shoulder of the peripheral module.

In some examples, the electronic device comprises a display screen supported by the outer housing.

In some examples, the mounting assembly includes a body slidably coupled to the outer housing to move along an axis with the peripheral module. The arm of the latch mechanism extends axially from the body and the lip of the latch mechanism is disposed along the arm distal the body. The arm has a first position with the lip positioned to engage the shoulder of the peripheral module to attach the mounting assembly to the peripheral module and a second position with the lip disengaged from the shoulder of the peripheral module to release the peripheral module from the mounting assembly. The arm is biased to the first position.

In some examples, the latch mechanism comprises a slotted portion coupled to the arm distal the lip and a leg extending axially from the slotted portion opposite the arm. The slotted portion includes an elongate slot oriented parallel to the axis. A pin extends from the body of the mounting assembly into the slot.

In some examples, the mounting assembly comprises a biasing member to axially bias the lip of the latch mechanism into the recess. The biasing member is axially positioned between the lip and the slotted portion.

In some examples, the body of the mounting assembly comprises an elongate slot. A pin that is fixably coupled to the outer housing extends through the slot.

In another example in accordance with the present disclosure, an electronic device comprises an outer housing including a recess to receive a peripheral module and includes a mounting assembly to move the peripheral module into and out of the recess of the outer housing. The mounting assembly includes a body moveably coupled to the outer housing and a latch mechanism moveably coupled to the body. The mounting assembly includes a first electrical connector to connect removably to a second electrical connector of the peripheral module. The latch mechanism includes an arm to engage and dis-engage the peripheral module.

In some examples, the electronic device comprises a display screen supported by the outer housing, and the first electrical connector is electrically coupled to an image processor disposed in the outer housing. The display screen is electrically coupled to the image processor.

In some examples, the image processor includes instructions that, when executed, cause the image processor to receive first data from the peripheral module, and cause the image processor to send second data to the display screen. The second data is based on the first data.

In some examples, a lip extends from the arm. In addition, the arm has a first position with a lip engaging a shoulder of the peripheral module to attach the mounting assembly to the peripheral module and a second position with the lip disengaged from the shoulder of the peripheral module to release the peripheral module from the mounting assembly. The arm is biased to the first position.

In another example in accordance with the present disclosure, an electronic device comprises an outer housing including a recess extending through an outer surface, a mounting assembly moveably coupled to the outer housing within the recess. In addition, the electronic device includes a peripheral module coupled to the mounting assembly to move with the mounting assembly. Further, the electronic device includes a first electrical connector and a second electrical connector.

In some examples, the mounting assembly includes a latch mechanism having a first position coupling the peripheral module to the mounting assembly and a second position decoupling the peripheral module from the mounting assembly. The first electrical connector is affixed to the mounting assembly and the second electrical connector is affixed on the peripheral module. The first electrical connector removably engages the second electrical connector.

In some examples, the mounting assembly includes a body slidably coupled to the outer housing to move along an axis with the peripheral module. The latch mechanism includes an arm extending axially from the body and a lip disposed along the arm distal the body. The lip engages a shoulder of the peripheral module with the latch mechanism in the first position to attach the peripheral module to the latch mechanism. The lip is disengaged from the shoulder of the peripheral module with the latch mechanism in the second position to release the peripheral module from the mounting assembly.

In some examples, the latch mechanism comprises a slotted portion coupled to an end of the arm distal the lip and a leg extending axially from the slotted portion opposite the arm. The slotted portion includes an elongate slot oriented parallel to the axis. A pin extends from the body of the mounting assembly into the slot of the slotted portion.

In some examples, the body of the mounting assembly comprises an elongate slot. A pin fixably coupled to the outer housing extends through the slot of the body.

In some examples, the electronic device comprises a cable coupled electrically between the first electrical connector and an image processor disposed within the outer housing.

FIG. 1 shows an example electronic device 100 in accordance with the principles disclosed herein. In this example, electronic device 100 includes a support base 102, a mounting arm 104 extending from base 102, and a display unit 110 supported on the upper end of arm 104. Display unit 110 includes an outer housing 112 and a display screen 114 supported within housing 112. Housing 112 includes a rear cover plate 113. Cover plate 113 may be removable from the remainder of housing 112 to provide maintenance access inside housing 112, or cover plate 113 may be bonded to or integrally formed with the remainder of housing 112. A peripheral module is moveably coupled to housing 112. In this example, the peripheral module is a camera module 120, and camera module 120 can move vertically up and down relative to housing 112, to retract into housing 112 and to extend from the top surface 122 of housing 112. Module 120 can be coupled to housing 112, as shown, or removed from housing 112 while housing 112 remains intact, for example, without removing rear cover plate 113. In the example shown in FIG. 1, electronic device 100 is an AiO computer. A user input device, such as a keyboard or mouse, may be coupled to device 100. In some examples, display unit 110 may operate alone, detached from base 102 or arm 104.

Figure 2:
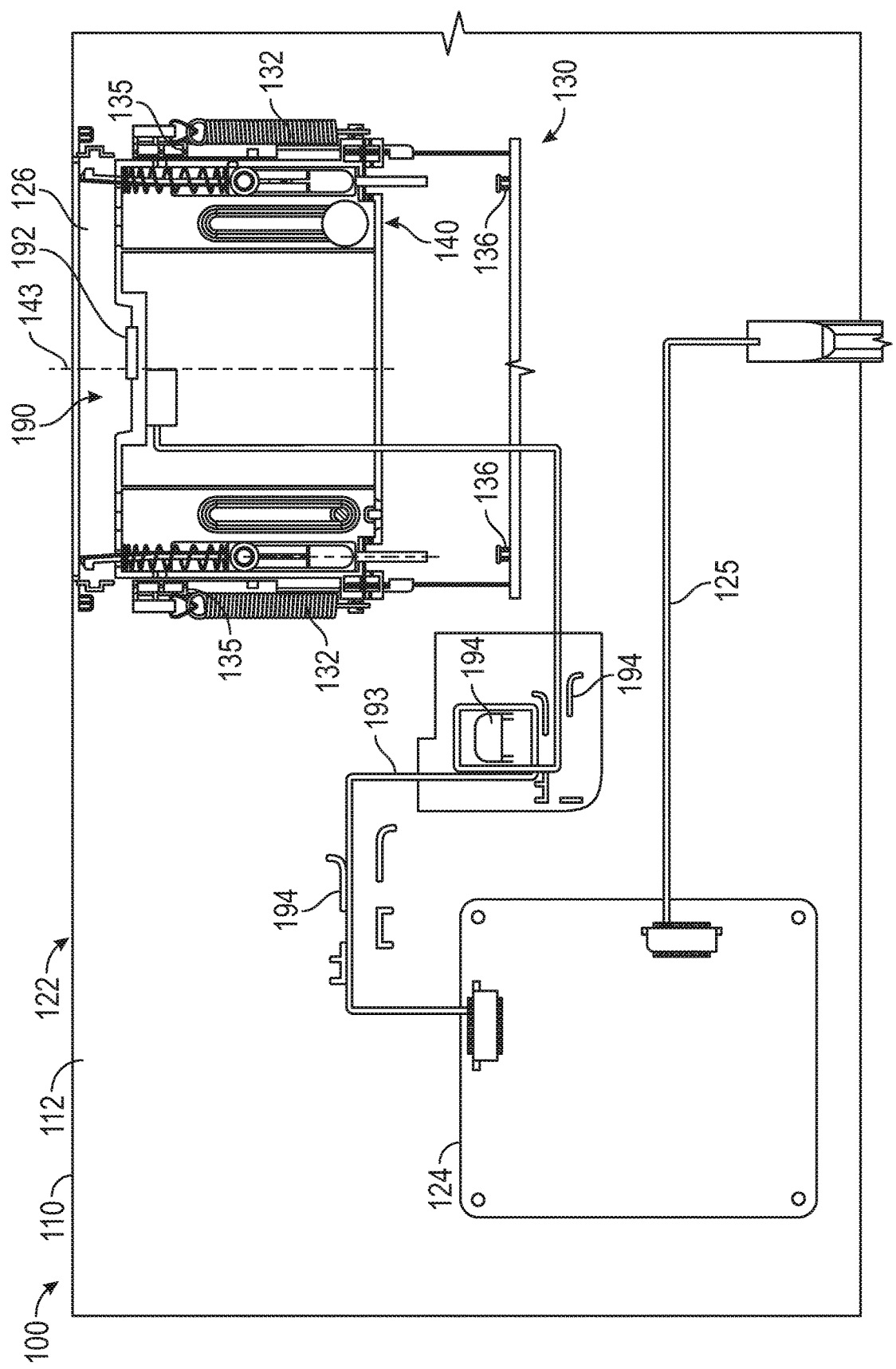
FIG. 2 shows an inside, partially schematic rear view of the electronic display device of FIG. 1 with a rear cover plate removed, showing a mounting assembly for a peripheral module, in accordance with various examples.

FIG. 2 shows an inside view of an example display unit 110 with a back cover plate removed and with camera module 120 removed. In this example, within housing 112, display unit 110 includes an electric connector or image circuit 124, a recess 126 extending from top surface 122, a mounting apparatus 130 disposed within or adjacent recess 126, and a mounting assembly 140 moveably coupled to housing 112 by apparatus 130. Mounting assembly 140 is to couple a peripheral module to housing 112 physically and electrically and may also be called a peripheral mounting assembly.

Image circuit 124 may be a connection board or image processor such as a scalar printed circuit assembly electrically coupled to the mounting assembly 140 with a cable 193 and coupled to the display screen 114 via a cable 125. The image circuit 124 may include machine readable instructions that, when executed, cause the image circuit 124 to receive a first set of data from a camera module that is electrically coupled to mounting assembly 140. The image circuit 124 may include machine readable instructions that, when executed, cause the image circuit 124 to send a second set of data to the display screen, wherein the second set of data is based on the first set of data.

In FIG. 2, mounting apparatus 130 is disposed inside housing 112 and includes a pair of resilient members or springs 132, a pair of shoulders 135, and a pair of stop plates or stops 136. Shoulders 135 are disposed on the lateral sides of recess 126 and mounting apparatus 130. Springs 132 bias the mounting assembly 140 toward top surface 122. FIG. 2 shows the position of mounting assembly 140 in its biased position and without any camera module installed. Thus, the position shown in FIG. 2 represents the extended or outward position of mounting assembly 140 with respect to housing 112. The biasing force of springs 132 may pull assembly 140 toward the extended position. In this example, some or all of assembly 140 is contained inside housing 112 or recess 126 with no portion of assembly 140 extending beyond outer surface 122 when mounting assembly 140 is in the extended position. Stops 136 are spaced from top surface 122 sufficiently that mounting assembly 140 may be disposed between outer surface 122 and stops 136 for all position of assembly 140. In this example, mounting assembly 140 and mounting apparatus 130 form a combined assembly that may be installed or removed from within housing 112 as a combined unit, which may involve removing a rear cover of housing 112 in some examples.

Figure 3:
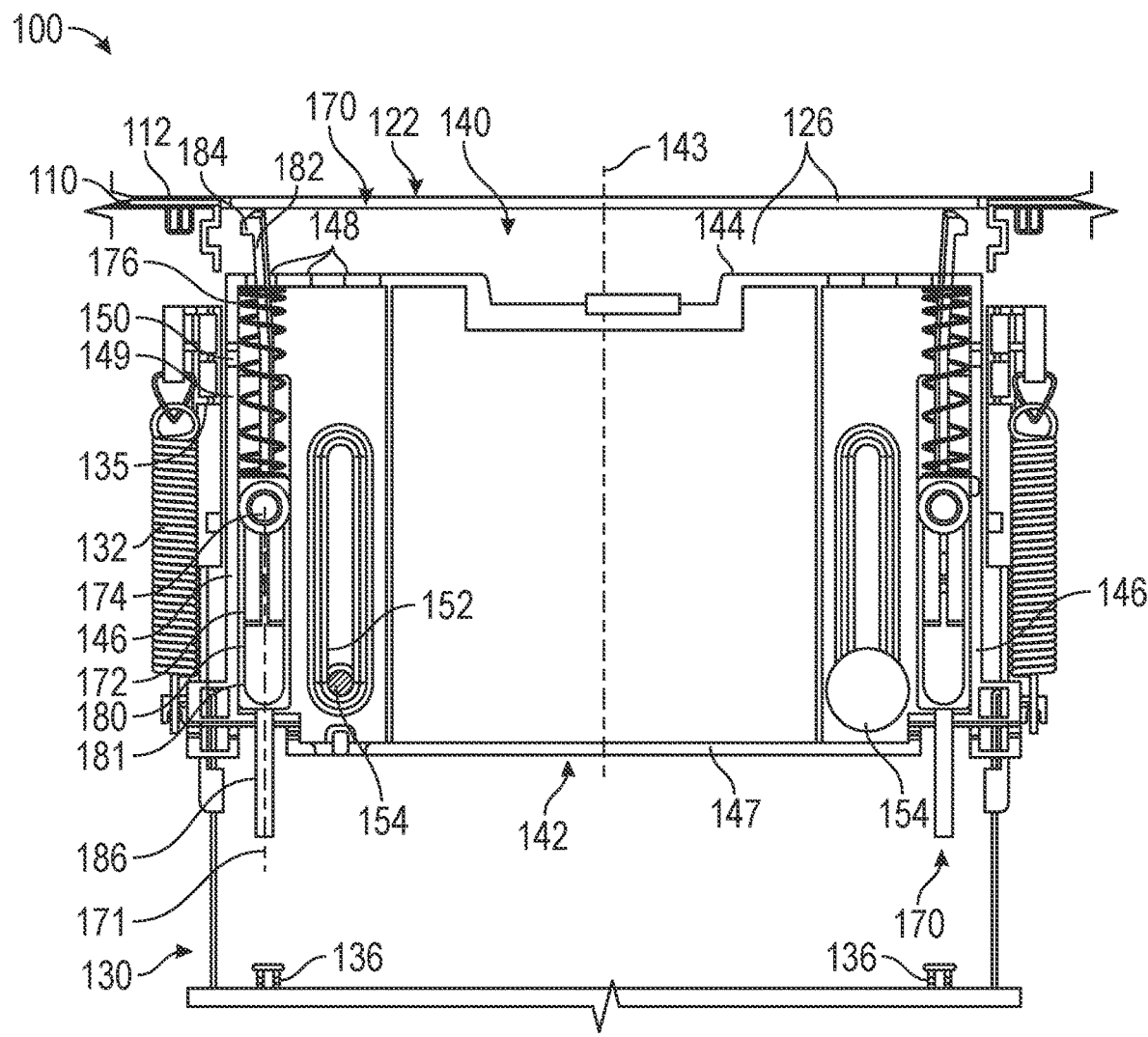
FIG. 3 shows an enlarged view of the electronic device of FIG. 2 in accordance with various examples.

FIG. 3 shows a closer view of an example mounting assembly 140 installed within recess 126 of housing 112 and with assembly 140 in the extended position. In FIG. 3, mounting assembly 140 includes a body 142, a body axis 143 generally passing through a mid-plane of body 142, a pair of latch mechanisms 170, and an electrical interconnect 190. Latch mechanisms 170 removably attach a camera module, such as camera module 120 (FIG. 1), to mounting assembly 140.

In this example, body 142 includes a top side 144, lateral sides 146, a bottom 147, a plurality of through-apertures 148 extending through top side 144 parallel to body axis 143, and a slot 149 in each lateral side 146. A body shoulder 150 is provided along each slot 149 proximal top side 144 and extends toward the body axis 143. In addition, body 142 includes a pair of elongate mounting slots 152 extending parallel to the body axis 143. A pin 154 extends through each slot 152. Pins 154 are fixably coupled to mounting apparatus 130 or housing 112. Body 142 is slidably coupled to housing 112 by pins 154 of mounting apparatus 130.

Referring still to FIG. 3, each latch mechanism 170 includes an elongate latch member 172 extending through an aperture 148 and along a latch axis 171 oriented parallel to body axis 143. Latch mechanism 170 is moveably coupled to the camera mounting body 142 and is biased away from top side 144 and into housing 112 by a biasing member, which in this example is a spring 176.

Referring again to FIG. 2, the example interconnect 190 includes an electrical connector 192 along a top side 144 and a cable 193 to couple electrically the connector 192 and image circuit 124. Cable 193 passes through strain relief devices 194 and includes sufficient length to allow the remainder of mounting assembly 140 to move unhindered by cable 193.

Figure 4:
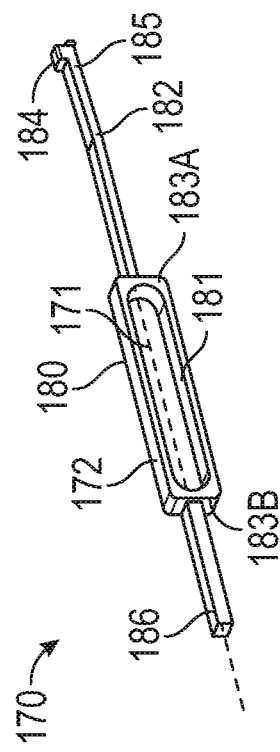
FIG. 4 shows the latch mechanism of the electronic device of FIG. 3 in accordance with various examples.

Referring now to FIG. 4, an example latch member 172 includes a slotted portion 180 including an elongate slot 181 extending along axis 171, an arm 182 extending from slotted portion 180, and a leg 186 extending from slotted portion 180. Slotted portion 180 has ends 183A; arm 182 extends axially (relative to axis 171) from end 183A, and leg 186 extends axially (relative to axis 171) from end 183B. Arm 182 includes a bend 185 such that the upper portion of arm 182 distal slotted portion 180 leans away from body axis 143. A shoulder or lip 184 is disposed along arm 182 distal slotted portion 180. Lip 184 extends substantially perpendicular to axis 171 and, in the assembly of FIG. 3, lip 184 extends generally away from body axis 143.

As shown in FIG. 3, a pin 174 extends from the camera mounting body 142 into slot 181. In this example, pin 174 is fixably attached to body 142. Pin 174 includes an enlarged head to retain latch member 172. Slotted portion 180 is disposed within or alongside camera mounting body 142, and arm 182 extends along the direction of axis 171 from camera mounting body 142 beyond top side 144 such that lip 184 is disposed outside body 142. Thus, latch mechanism 170 is slidably coupled to the camera mounting body 142 by pin 174.

Spring 176 is coupled between latch member 172 and body 142 to bias latch member 172 away from top surface 122 and into or alongside body 142, which also biases distal end of arm 182 and lip 184 into the recess 126. FIG. 3 shows this retracted, biased position. The distal end of arm 182 and lip 184 may remain inside or return to recess 126 when no camera module is attached due to the action of spring 176 and due to the arrangement of mounting slots 152 and pins 154 that extend through slots 152. The distal end of arm 182 and lip 184 may be retained inside recess 126 (e.g., in the biased position) to protect them from damage when no camera module is installed.

As shown in FIG. 3, stops 136 of mounting apparatus 130 are aligned with legs 186 of latch mechanism 170 to limit the axial movement (relative to axis 171) of latch member 172 into housing 112. For example, if mounting assembly 140 moves sufficiently downward, then legs 186 may press against stops 136, thereby compressing springs 176 and limiting the distance that arms 182 and lips 184 move downward, away from top surface 122 of housing 112. Limiting the downward movement of arms 182 and lips 184 may aid the installation of a camera module 120 by augmenting the entry of arms 182 into the camera module and providing an opportunity for lips 184 to grasp the module, as will be described in more detail below.

Figure 5:
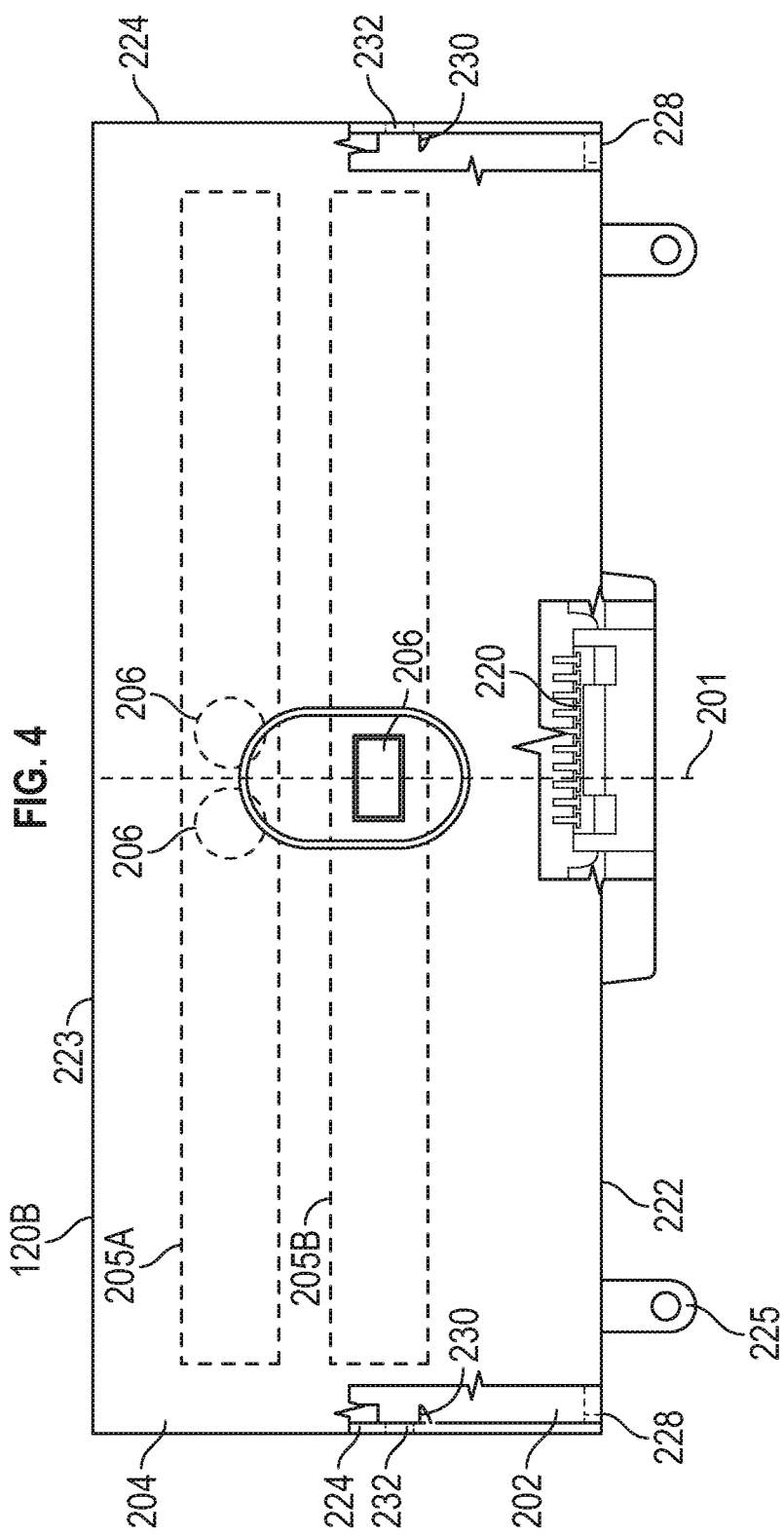
FIG. 5 shows a partial cross-sectional rear view of a camera module for removably attaching to the latch mechanism of FIG. 3 in accordance with various examples.

FIG. 5 shows an example of a camera module 120A that is illustrative of camera module 120 of FIG. 1 and may be installed in device 100. In FIG. 5, camera module 120A includes a central axis 201, a camera housing 202, a cover plate 204 closing camera housing 202, a first camera 205A mounted inside housing 202, a second camera 205B mounted inside housing 202, and an electrical connector 220. In this example, camera 205B is spaced apart from camera 205A along axis 201. Connector 220 electrically couples to electrical connector 192 of interconnect 190 on mounting assembly 140 (FIG. 2). Camera module 120A also includes a mounting end 222, a distal end 223, lateral sides 224, a pair of screw tabs 225 extending axially outward from mounting end 222, a pair of second apertures 228, and a pair of internal shoulders 230. Each aperture 228 extends through mounting end 222 adjacent one of the lateral sides 224. Each shoulder 230 is disposed on one of the lateral sides 224, laterally adjacent to and axially off-set from an aperture 228 and facing distal end 223. An aperture 232 extends through each lateral side 224 adjacent each shoulder 230, opposite the aperture 228 that corresponds to the shoulder 230. Near each lateral side 224, an aperture 228 and a shoulder 230 are to receive an arm 182 and a lip 184, respectively, of a latch mechanism 170 (FIG. 4). Electrical connector 220 extends axially downward at a mounting end 222.

In camera module 120A, first camera 205A includes a pair of camera sensors 206 pointed in a first direction (e.g., into the page of FIG. 5) through housing 202, and second camera 205B includes a camera sensor 206 pointed in a second direction through cover plate 204 and opposite the first direction. Any of camera sensors 206 may be selected from a group that includes sensor types such as: RGB sensors, RGB high definition sensors, infrared (IR) sensors, and other suitable image sensors.

Figure 6:
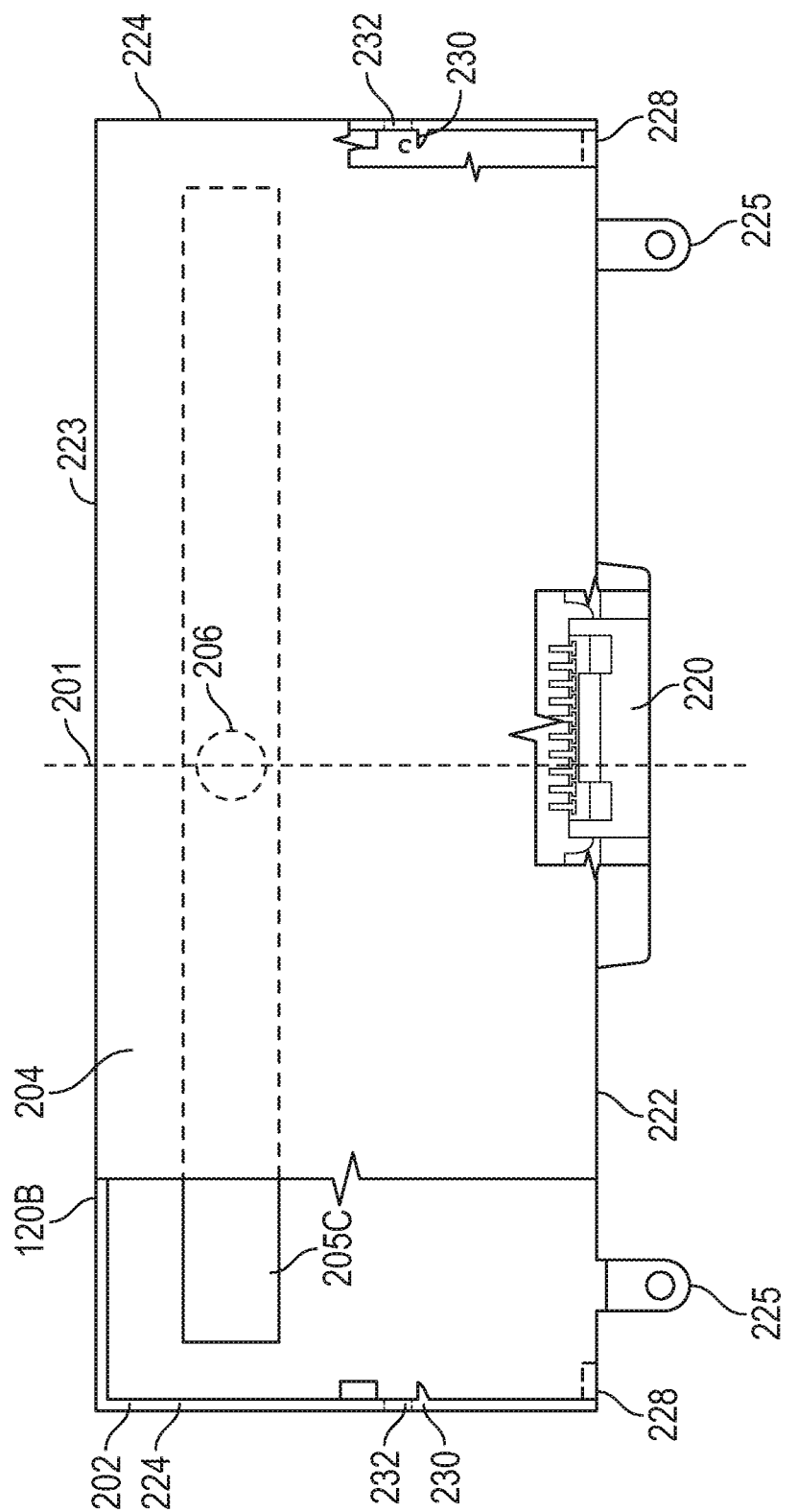
FIG. 6 shows a partial cross-sectional rear view of another camera module for removably attaching to the latch mechanism of FIG. 3 in accordance with various examples.

FIG. 6 shows an example of a camera module 120B that is illustrative of camera module 120 of FIG. 1 and may be installed in device 100. Camera module 120B is similar or identical to module 120A with an exception that camera module 120B has one camera 205C instead of two cameras. In particular, camera module 120B includes a central axis 201, a camera housing 202, a cover plate 204, a camera 205C (which may be similar or identical to either camera 205A or 205B) mounted inside housing 202 and cover plate 204, and an electrical connector 220, each as previously described. Camera module 120B also includes a mounting end 222, a distal end 223, lateral sides 224, a pair of screw tabs 225 extending outward from mounting end 222, a pair of apertures 228, a pair of internal shoulders 230, and a pair of second apertures 232, arranged as previously described with respect to module 120A. Again, each aperture 228 and shoulder 230 is to receive an arm 182 and a lip 184, respectively, of a latch mechanism 170.

In camera module 120B, camera 205C includes a camera sensor 206 pointed in a first camera direction (e.g., into the page of FIG. 6) through housing 202. The sensor 206 of module 120A may be selected from any of the type of sensors mentioned above. In some examples of module 120B, camera 205C is replaced by another camera, such as a camera 205A, 205B. Although the camera modules 120A, 120B have one and two cameras, respectively, in other examples, a camera module compatible with electronic device 100 may have any number of cameras, and further, each camera may have any number of camera sensors.

Figure 7:
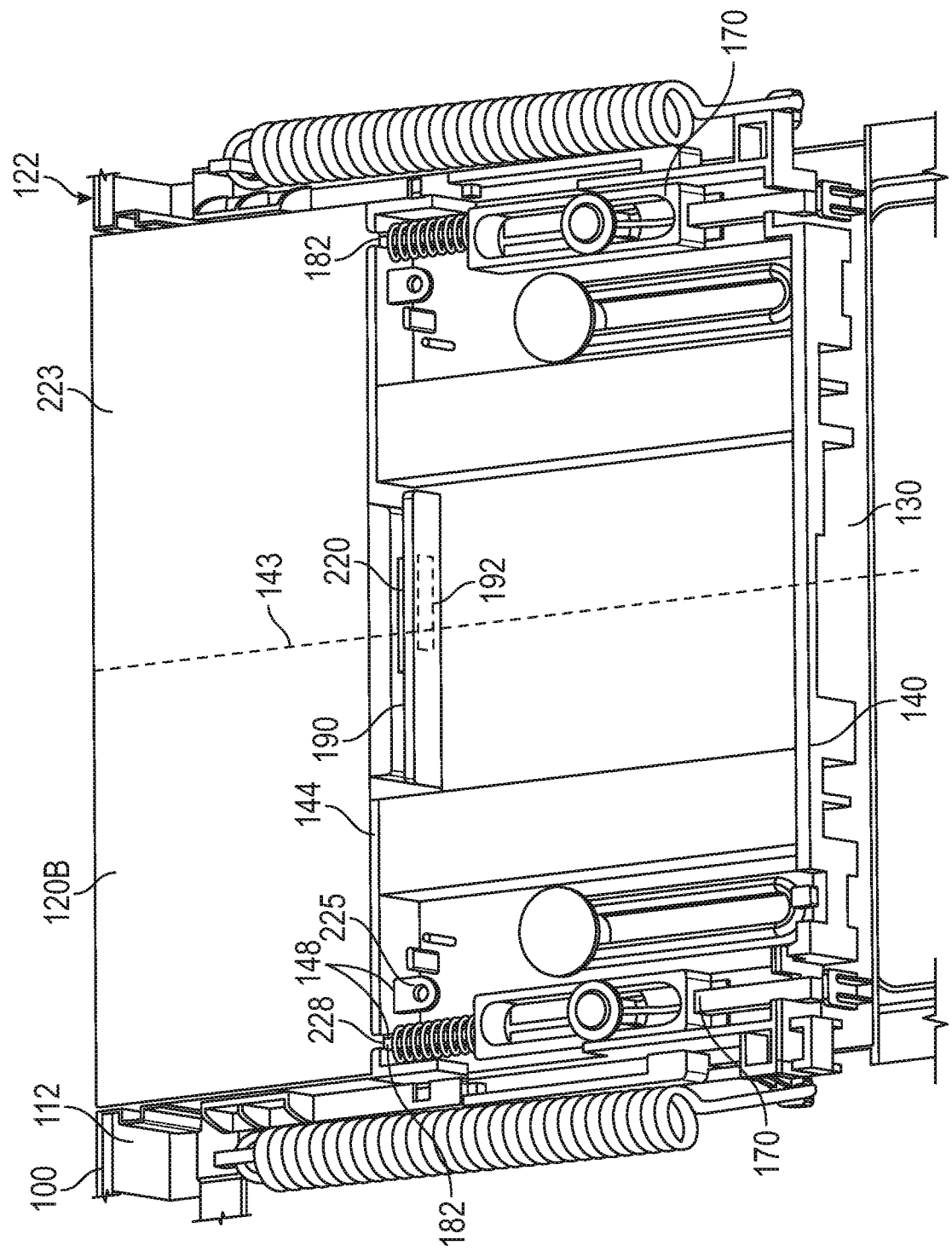
FIG. 7 shows a perspective view of the camera module of FIG. 6 installed in the electronic display device of FIG. 1 with the camera module in a recessed position in accordance with various examples.

FIG. 7 and FIG. 8 show examples of the camera module 120B installed in electronic device 100 with module 120B coupled to mounting assembly 140 to move with assembly 140 along body axis 143. In FIG. 7, assembly 140 and module 120B are in a recessed position with module 120B entirely or almost fully received within recess 126 of housing 112. In FIG. 8, assembly 140 and module 120B are in a second outward position. When mounted to assembly 140 as shown in these two figures, camera module 120B may move into and out of recess 126 of housing 112 (FIGS. 2 and 3). This mounted configuration may be achieved by inserting module 120B into recess 126 and by pushing module 120B toward top side 144. Latch arms 182 extend through apertures 228 in module 120B. As shown in FIG. 8, lips 184 of arms 182 engage shoulders 230 within module 120B, attaching module 120B to assembly 140 and device 100. This engaged arrangement represents a first position for each latch mechanism 170 and its arm 182. Latch mechanism 170 is biased to this first position. Arm 182 may rest against or press against a boss 236 pointing outward in module 120. Bend 185 in arm 182 may be adjacent boss 236 and may be closer to outer surface 122 than boss 236. Tabs 225 extend through various apertures 148 in mounting assembly 140, and electrical connector 220 is removably connected with electrical connector 192 of interconnect 190. Although, housing 112 is shown without a rear cover plate for clarity during this discussion of FIGS. 7 and 8, in general, camera module 120B may be installed in housing 112 and coupled to mounting assembly 140 while rear cover plate 113 (FIG. 1) is installed on housing 112. Removal of the camera module can likewise be accomplished while rear cover plate 113 is installed on housing 112. In a related example, a camera module 120B may be installed or removed while housing 112 is fully intact, ready for shipment (e.g., held within a shipping box) or ready for a consumer to use.

Referring still to FIG. 8, to remove camera module 120B from mounting assembly 140 or device 100, a pin, a paperclip, or another type of probe (not shown) may be inserted into each aperture 232 in lateral sides 224 of module 120B to push each arm 182 and lip 184 away from the adjacent shoulder 230, toward body axis 143. This operation moves latch mechanism 170 and its arm 182 to a second position disengaged and spaced-apart from shoulder 230. The decoupling of module 120B from assembly 140 may be completed by pulling module 120B away from the inserted arms 182 and top from top side 144, which decouples interconnect 190, removing electrical connector 220 from connector 192. The flexible, resilient arms 182 relax, bending away from body axis 143, toward their original shape. With module 120B decoupled, springs 176 will cause arms 182 to retract to a position inside the top surface 122 of housing 112, like the biased position of latch mechanism 170 shown in FIG. 3.

The easy removal process that involves bending arms 182 to remove a camera module can be prevented by installing a fastener, such as a screw, through one or all tabs 225 and into anchor point(s) in mounting body 142. Installing or removing the fasteners for tabs 225 may involve removing rear cover plate 113 (FIG. 1). Preventing the easy removal process may be beneficial when electronic device 100 is used in a public location, and an owner wishes to reduce the potential for people to remove and take a camera module.

In the manner described, arms 182 on the latch mechanism are to engage and dis-engage the camera module 120B from assembly 140. Other embodiments of camera module 120, e.g., module 120A, may be coupled and decoupled to assembly 140 in the same manner as module 120B.

Referring to the recessed position of assembly 140 and module 120B shown in FIG. 7, distal end 223 of module 120B may be flush or recessed, with respect to top surface 122 of housing 112. In some recessed positions, distal end 223 may extend slightly beyond top surface 122 of housing 121. Assembly 140 may be near its fully retracted position, with the top of slots 152 almost contacting pins 154. In FIG. 8, assembly 140 and module 120B are in a second outward position in which assembly 140 is not as close to outer surface 112 as it was in the first outward position of FIG. 2 and FIG. 3. In the second outward position, a portion of module 120B, including sensor 206 (not shown here) of camera 205C, is outside recess 126. Accordingly, FIG. 8 represents an operation position of module 120B because camera 205C is in a location where it can be used to capture images.

Although, the camera modules disclose herein were mounted to travel through recess 126 extending through top surface 122 of electronic device 100; in some embodiments, a peripheral module attached to a mounting assembly 140 is coupled to move through another surface (for example a side surface or a front surface) in an electronic device. Recess 126 has been described as an interior recess in housing 112, but in some examples, a camera module is mounted in accordance with the present disclosure for movement into and out from an exposed recess that extends through the front side or the rear cover plate 113 (FIG. 1) of housing 112 in addition to the recess extending though a top surface or a side surface.

Some examples include microphones in a peripheral module, for example, in a camera module 120, 120A, 120B. In some of these examples, a pair of microphones is located on distal end 223 of the camera module. In this location, the microphones can face outward even when the camera module is retracted into the housing of an electronic device, such as housing 112. This placement may allow machine readable instructions, e.g., software, to activate a voice call or a "digital assistant" like "Siri," "Alexa," "Cortana," etc. while the camera(s) is/are recessed into the housing, to operate the digital assistant with privacy from a camera(s). In other instances, the digital assistant may be activated while the camera is extended beyond the housing. The outward placement of microphones 235 may allow them to receive sound from multiple or all sides of the camera module, possibly collecting sound from a volume that spans more than 180 degrees or spans up to or including 360 degrees. Some other examples, a camera module may have microphones disposed at another location, such as a side that includes a camera sensor 206.

The above discussion is meant to be illustrative of the principles and various examples of the present disclosure. Numerous variations and modifications to the examples described above are possible. The following claims should be interpreted to embrace all such variations and modifications. For example, although various examples of the electronic devices disclosed may be implemented as AiO computers or within AiO computers, the concepts described herein may also be applied to other electronic devices, such as other desktop computers, stand-alone monitors, and portable computers (including "tablet" and "laptop" computers), as examples.

What is claimed is:

1. An electronic device comprising:
an outer housing including a recess to receive a peripheral module; and
a mounting assembly to move the peripheral module into and out of the recess of the outer housing, wherein the mounting assembly is moveably coupled to the outer housing;
wherein the mounting assembly includes a latch mechanism to removably attach the mounting assembly to the peripheral module;
wherein the mounting assembly includes a first electrical connector to removably connect to a second electrical connector of the peripheral module;
wherein the latch mechanism includes an arm and a lip disposed along the arm, a slotted portion coupled to the arm distal the lip and a leg extending axially from the slotted portion opposite the arm; and
wherein the arm and the lip are to move into and out of engagement with a shoulder of the peripheral module.

2. The electronic device of claim 1 comprising a display screen supported by the outer housing.

3. The electronic device of claim 1, wherein the mounting assembly includes a body slidably coupled to the outer housing to move along an axis with the peripheral module;
wherein the arm of the latch mechanism extends axially from the body and the lip of the latch mechanism is disposed along the arm distal the body;
wherein the arm has a first position with the lip positioned to engage the shoulder of the peripheral module to attach the mounting assembly to the peripheral module, wherein the arm has a second position with the lip disengaged from the shoulder of the peripheral module to release the peripheral module from the mounting assembly, wherein the arm is biased to the first position.

4. The electronic device of claim 3,
wherein the slotted portion includes an elongate slot oriented parallel to the axis; and
wherein a pin extends from the body of the mounting assembly into the slot.

5. The electronic device of claim 3, wherein the mounting assembly comprises a biasing member to axially bias the lip of the latch mechanism into the recess, wherein the biasing member is axially positioned between the lip and the slotted portion.

6. The electronic device of claim 3, wherein the body of the mounting assembly comprises an elongate slot, and wherein a pin fixably coupled to the outer housing extends through the slot.

7. An electronic device comprising:
an outer housing including a recess to receive a peripheral module; and
a mounting assembly to move the peripheral module into and out of the recess of the outer housing, wherein the mounting assembly includes a body moveably coupled to the outer housing and a latch mechanism moveably coupled to the body;
wherein the mounting assembly includes a first electrical connector to connect to a second electrical connector of the peripheral module;
wherein the latch mechanism includes an arm to engage and dis-engage the peripheral module, the arm extending axially from the body and a lip disposed along the arm distal the body, the latch mechanism comprising a slotted portion coupled to the arm distal the lip and a leg extending axially from the slotted portion opposite the arm.

8. The electronic device of claim 7 comprising a display screen supported by the outer housing;
wherein the first electrical connector is electrically coupled to an image processor disposed in the outer housing, wherein the display screen is electrically coupled to the image processor.

9. The electronic device of claim 8, wherein the image processor includes instructions that, when executed, cause the image processor to receive first data from the peripheral module;
wherein the image processor includes instructions that, when executed, cause the image processor to send second data to the display screen, wherein the second data is based on the first data.

10. The electronic device of claim 7, wherein a lip extends from the arm; and
wherein the arm has a first position with the lip engaging a shoulder of the peripheral module to attach the mounting assembly to the peripheral module and a second position with the lip disengaged from the shoulder of the peripheral module to release the peripheral module from the mounting assembly, wherein the arm is biased to the first position.

11. An electronic device comprising:
an outer housing including a recess extending through an outer surface;
a mounting assembly moveably coupled to the outer housing within the recess, the mounting assembly including a body;
a peripheral module coupled to the mounting assembly to move with the mounting assembly, wherein the mounting assembly includes a latch mechanism having a first position coupling the peripheral module to the mounting assembly and a second position decoupling the peripheral module from the mounting assembly, wherein the latch mechanism includes an arm extending axially from the body and a lip disposed along the arm distal the body, the latch mechanism comprising a slotted portion coupled to the arm distal the lip and a leg extending axially from the slotted portion opposite the arm;
a first electrical connector affixed to the mounting assembly; and
a second electrical connector affixed on the peripheral module;
wherein the first electrical connector removably engages the second electrical connector.

12. The electronic device of claim 11, wherein the body is slidably coupled to the outer housing to move along an axis with the peripheral module;
wherein the lip engages a shoulder of the peripheral module with the latch mechanism in the first position to attach the peripheral module to the latch mechanism, and the lip is disengaged from the shoulder of the peripheral module with the latch mechanism in the second position to release the peripheral module from the mounting assembly.

13. The electronic device of claim 12,
wherein the slotted portion includes an elongate slot oriented parallel to the axis; and
wherein a pin extends from the body of the mounting assembly into the slot of the slotted portion.

14. The electronic device of claim 13, wherein the body of the mounting assembly comprises an elongate slot, and wherein a pin fixably coupled to the outer housing extends through the slot of the body.

15. The electronic device of claim 11 comprising a cable coupled electrically between the first electrical connector and an image processor disposed within the outer housing.

* * * * *